US007734567B2

(12) United States Patent
Okamoto et al.

(10) Patent No.: US 7,734,567 B2
(45) Date of Patent: Jun. 8, 2010

(54) DOCUMENT DATA ANALYSIS APPARATUS, METHOD OF DOCUMENT DATA ANALYSIS, COMPUTER READABLE MEDIUM AND COMPUTER DATA SIGNAL

(75) Inventors: Hiroshi Okamoto, Kanagawa (JP); Yukihiro Tsuboshita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 163 days.

(21) Appl. No.: 11/515,870

(22) Filed: Sep. 6, 2006

(65) Prior Publication Data

US 2007/0208707 A1 Sep. 6, 2007

(30) Foreign Application Priority Data

Mar. 6, 2006 (JP) .............................. 2006-060124

(51) Int. Cl.
*G06F 17/30* (2006.01)
*G06F 7/00* (2006.01)
*G06F 7/06* (2006.01)
(52) U.S. Cl. ......................... 707/3; 707/102; 707/104.1
(58) Field of Classification Search ..................... 707/2, 707/5, 7, 36 R, 3, 102, 104.1
See application file for complete search history.

(56) References Cited

U.S. PATENT DOCUMENTS

| 5,659,338 | A | * | 8/1997 | Nakasuji et al. | ............. | 345/536 |
| 5,802,515 | A | * | 9/1998 | Adar et al. | ....................... | 707/5 |
| 5,933,145 | A | * | 8/1999 | Meek | ......................... | 715/835 |
| 5,991,751 | A | * | 11/1999 | Rivette et al. | ................... | 707/1 |
| 6,289,342 | B1 | * | 9/2001 | Lawrence et al. | ............... | 707/7 |
| 6,295,062 | B1 | * | 9/2001 | Tada et al. | .................... | 715/835 |
| 6,347,319 | B1 | * | 2/2002 | Moore | ........................ | 705/36 R |
| 6,421,668 | B1 | * | 7/2002 | Yakhini et al. | .................. | 707/6 |
| 6,499,026 | B1 | * | 12/2002 | Rivette et al. | ................... | 707/2 |
| 2001/0027452 | A1 | * | 10/2001 | Tropper | ......................... | 707/3 |
| 2004/0267793 | A1 | * | 12/2004 | Sato | ........................... | 707/100 |
| 2005/0086260 | A1 | * | 4/2005 | Canright et al. | ........... | 707/104.1 |

FOREIGN PATENT DOCUMENTS

| JP | A-2000-148789 | 5/2000 |
| JP | A-2005-216187 | 8/2005 |

OTHER PUBLICATIONS

Berklund, T-SQL Enhancements in Yukon, Oct. 30, 2003.*
Brinn et al., Investigation of Forward Citation Count as a Patent Analysis Method, 2003.*
McLean, Patent Space Visualization for Patent Retrieval, Jul. 20, 2000.*

(Continued)

*Primary Examiner*—James Trujillo
*Assistant Examiner*—William Spieler
(74) *Attorney, Agent, or Firm*—Oliff & Berridge, PLC

(57) ABSTRACT

A document data analysis apparatus, the document data analysis apparatus being connected to a database storing plural document groups which a citation relationship is defined, each of the plural document groups including plural documents, includes: inputting unit that inputs an analysis condition including at least one of a document search condition and a specification of a seed document group, the seed document group being a seed of an active propagation process; determining unit that determines an initial active value of each of plural documents based on the analysis condition; executing unit that executes the active propagation process based on the initial active value and the citation relationship; and display that displays a result of the active propagation process.

16 Claims, 7 Drawing Sheets

OTHER PUBLICATIONS

Tsuboshita et al., "Information Retrieval Based on a Neural-Network System with Multi-stable Neurons", ICANN 2005, LNCS 3697, pp. 865-872 (2005).

Anderson et al., "Spread of Activation", Journal of Experimental Psychology: Learning, Memory, and Cognition, vol. 10, No. 4, 791-798 (May 1984).

* cited by examiner

FIG. 3

| DOCUMENT IDENTIFIER | ENTITY DATA | BIBLIOGRAPHIC INFORMATION ||| VITAL IMPORTANCE INFORMATION |
| --- | --- | --- | --- | --- | --- |
| | | APPLICANT | APPLICATION DATE | | |
| D1 | xxxx ··· | dddd | eeee | ··· | UNDER EXAMINATION |
| D2 | yyyy ··· | ffff | gggg | ··· | PATENT TERMINATED |
| ⋮ | ⋮ | ⋮ | ⋮ | ⋮ | ⋮ |

DOCUMENT DATA ANALYSIS APPARATUS, METHOD OF DOCUMENT DATA ANALYSIS, COMPUTER READABLE MEDIUM AND COMPUTER DATA SIGNAL

BACKGROUND

1. Technical Field

This invention relates to a document data analysis apparatus for conducting a relational analysis on a document group where the citation relationship is defined, such as patent documents.

2. Related Art

In scientific and technical documents including patent documents, citation is frequently made between the documents. For example, a scholarly paper would be often created by citing other papers and for a patent document, documents, etc., disclosing arts equivalent to the invention described in the patent document are enumerated as literature cited in the process of the examination of the patent document.

SUMMARY

It is an object of the invention to provide a document data analysis apparatus that can present the disclosure situation of documents from the viewpoint from the context specified by the user.

A document data analysis apparatus, the document data analysis apparatus being connected to a database storing plural document groups which a citation relationship is defined, each of the plural document groups comprising plural documents, includes: inputting unit that inputs an analysis condition comprising at least one of a document search condition and a specification of a seed document group, the seed document group being a seed of an active propagation process; determining unit that determines an initial active value of each of the plural documents based on the analysis condition; executing unit that executes the active propagation process based on the initial active value and the citation relationship; and display that displays a result of the active propagation process.

BRIEF DESCRIPTION OF THE DRAWINGS

Exemplary embodiment of the present invention will be described in detail based on the following figures, wherein:

FIG. 3 is a schematic representation that illustrates an example of a document database connected to the document data analysis apparatus according to the exemplary embodiment of the invention so that the apparatus can access the database;

DETAILED DESCRIPTION

Figure 1:
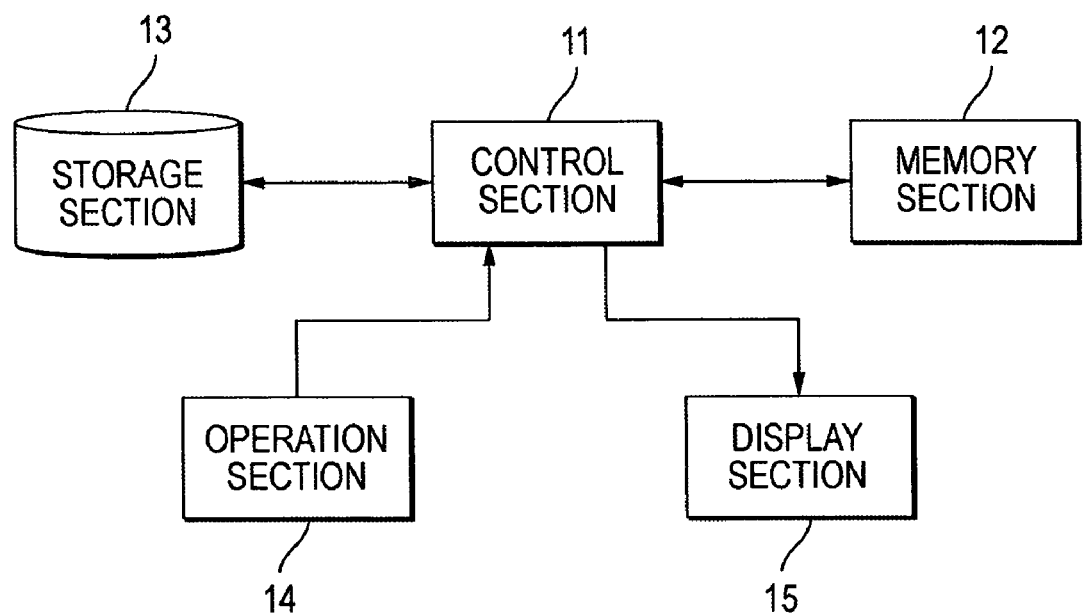
FIG. 1 is a block diagram that illustrates a configuration example of a document data analysis apparatus according to an exemplary embodiment of the invention.

Referring now to the accompanying drawings, there is illustrated an exemplary embedment of the invention. An document data analysis apparatus 1 according to an exemplary embedment of the invention is made up of a control section 11, a memory section 12, a storage section 13, an operation section 14, and a display section 15, as illustrated in FIG. 1.

The control section 11 is a program control device of a CPU, etc., and operates in accordance with a program stored in the memory section 12. In the embodiment, the control section 11 determines the initial active value of each of the documents to which processing is applied based on the analysis condition specified by the user and executes active propagation processing based on the citation function between the initial active value and the document. The specific processing of the control section 11 is described later in detail.

The memory section 12 is implemented including a memory device of RAM, ROM, etc. The memory section 12 stores programs executed by the control section 11. The memory section 12 also operates as work memory of the control section 11.

Figure 2:
FIG. 2 is a schematic representation that illustrates an example of a database for defining the citation relationship between documents referenced by the document data analysis apparatus according to the exemplary embodiment of the invention.

The storage section 13 is a hard disk, etc., and functions as a database in the embodiment. The storage section 13 stores the documents to which processing is applied. Citation relationship information is stipulated for each document. The citation relationship information is information associating information determining the cited document (document identifier) and the document identifier determining the citing document, for example, as illustrated in FIG. 2. If document A cites document B, the document A becomes the citing document and the document B becomes cited document.

The operation section 14 is a keyboard, a mouse, etc., and receives user operation and outputs the description of the command operation to the control section 11. The display section 15 is a display, etc., and displays information in accordance with the command input from the control section 11.

In the description to follow, it is assumed that the document in the embodiment is a patent document and that the document identifier, the entity data of the document (text document, etc., as patent document), applicant information and application date information as bibliographic information, and information as to whether or not the application is granted a patent, whether or not the patent is terminated, whether or not the application cannot be granted a patent (decision of rejection) (which will be hereinafter referred to as vital importance information of patent), etc., are stored in the storage section 13 in association with each other.

Upon reception of input of an analysis condition from the operation section 14, the control section 11 starts document data analysis processing. The analysis condition is, for example, a search condition concerning documents stored in the storage section 13; as a specific example of the analysis condition, a search keyword and a bibliographic condition (applicant, classification sign, etc.,) are specified. As another example of the analysis condition, some of the documents stored in the storage section 13 are specified as a seed document group.

Figure 4:
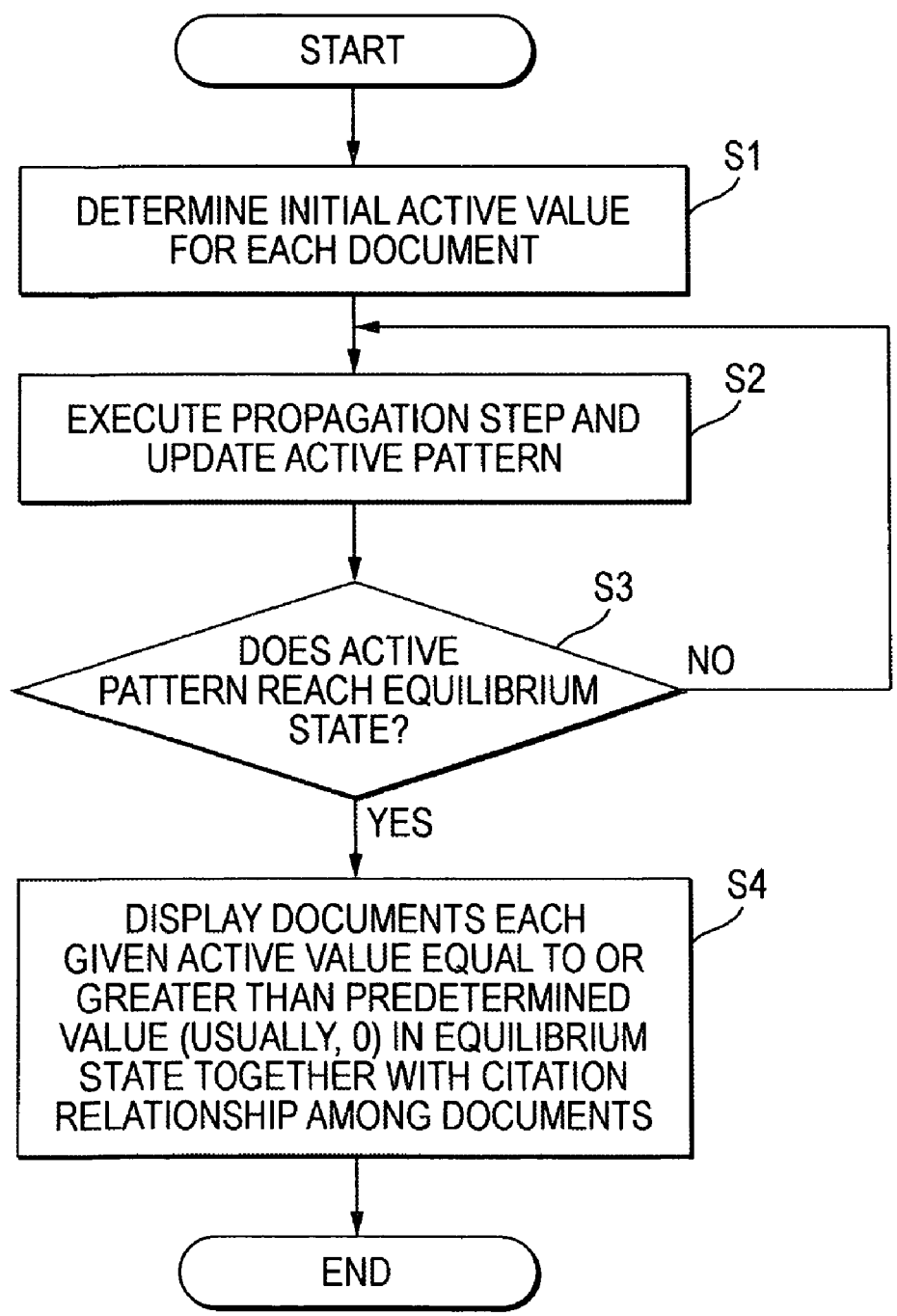
FIG. 4 is a flowchart that illustrates an example of analysis processing of document data in the document data analysis apparatus according to the exemplary embodiment of the invention.

Upon reception of an analysis start command together with the analysis condition, the control section 11 starts processing illustrated in FIG. 4 and determines the initial active value for active propagation processing (here, scalar value) for each of documents D1, D2, . . . stored in the storage section 13 (S1). The initial active value can be the value of the similarity between the character string entered as the search keyword and each document, for example. To compute the similarity, a widely known method such as a method of extracting a word occurring in both the document and the search keyword and weighting based on information of the occurrence frequency of the word, etc., can be adopted.

The storage section 13 may be searched for documents based on the specification of the search keyword and the bibliographic condition, the document group obtained as the search result may be adopted as a seed document group, the active value of each of the documents belonging to the seed document group may be set to a non-zero value (for example, the similarity value mentioned above or a constant value), and the active value of each of the documents not belonging to the seed document group may be set to zero for determining the initial active values. If the seed document group itself is specified as an analysis condition, the initial active values can also be determined in a similar manner.

Thus, the control section 11 provides the vector amount of the initial active value for each document $$(X_1, X_2, \ldots X_N) \quad (1)$$

where N is the total number of the documents and Xi is the initial active value of the ith document Di. The vector represented by expression (1) is called an active pattern.

The control section 11 updates the active pattern according to the following method (propagation step): The active value Xi of the ith document is updated as $$X_i = f(g(X_{j1}), g(X_{j2}), \ldots, h(X_{k1}), h(X_{k2}) \ldots) \quad (2)$$

using a group of documents Dj1, Dj2, . . . (i≠j1, i≠j2 . . . ) citing the ith document Di (associated with the ith document as the cited document) and a group of documents Dk1, Dk2, . . . (i≠k1, i≠k2 . . . ) cited by the ith document Di (associated with the ith document as the citing document) (S2).

Here, it is assumed that a function g having the active value of the cited document as an argument and a function h having the active value of the citing document as an argument are each a function whose form is determined independently of the contents of the document (contained character string, etc.,) as the argument. A function f is a function whose form is determined independently of the contents of the ith document. The specific forms of the functions f, g, and h are determined by the active propagation type.

Here, as active propagation processing, various methods such as a method disclosed in JP-A-2005-216187, a method described in Tsuboshita, Y. & Okamoto. H. (2005). Information Retrieval Based on a Neural-Network System with Multi-stable Neurons. In W. Duch et al. (Eds.), ICANN 2005, LNCS 3697. (865-872) Berlin, Heidelberg: Springer-Verlag, and an active spread method widely known (Anderson, J., R., Pirolli, P., L., "Spread of Activation" Journal of Experimental Psychology: Learning, Memory, and Cognition, Vol. 10, No. 4, 791-798 (1984)) can be adopted.

Further, the control section 11 determines whether or not the active pattern reaches an equilibrium state (S3). To make this determination, a predetermined scalar function, etc., (Liapunov function, etc.,) determined from the active pattern is considered, and whether or not the difference between the value of the function for the pre-updated active pattern and the value of the function for the post-updated active pattern becomes less than a predetermined threshold value is determined. Here, when it is determined that the difference does not become less than the threshold value, namely, when the active pattern does not reach the equilibrium state, the control section 11 returns to step S2 and again executes the propagation step.

If it is determined at step S3 that the active pattern reaches the equilibrium state, the documents each given the active value equal to or greater than a predetermined value (usually, set to 0) in the equilibrium state are displayed together with the citation relationship among the documents (S4).

Here, the similarity with the seed document group can be computed by making a comparison between the vector value involved in the seed document group such as the occurrence frequency of each word obtained from the documents belonging to the seed document group and a similar vector value involved in the document group relating to a partial active pattern.

The operation of enumerating combinations about subsets of elements of the active pattern and finding out the combination satisfying the selection condition described later from among them results in a large calculation amount. However, the equilibrium state of the active propagation is a state approximately satisfying the selection condition and further the equilibrium state can be derived in a finite time and therefore actually the partial active pattern satisfying the selection condition can be found out without the need for a large calculation amount.

That is, first, plural partial active patterns each being a combination of the elements belonging to subset are generated about all or some of the possible subsets of element set of active pattern. A partial active pattern satisfying the selection condition that "the similarity with the seed document group or the search condition becomes the maximum value and the active value of each document satisfies expression (2)" is selected from among the partial active patterns.

The partial active pattern selected at step S5 is adopted as a relevant document group and the control section 11 displays the documents contained in the relevant document group as icons and terminates the processing.

Thus, in the embodiment, the active propagation method is used, whereby a relevant document group to the technical area specified in a query as an analysis condition by the user can be extracted and further can be visualized like a network based on the citation relationship, whereby it is made possible to aid the user in keeping track of the situation of the specified technical area. That is, it is made possible for the user to visually understand which document is primary and which document is secondary and which citation relationship is a trunk and which citation relationship is a branch, etc., in the extracted technical document group of patent, etc.

Figure 5:
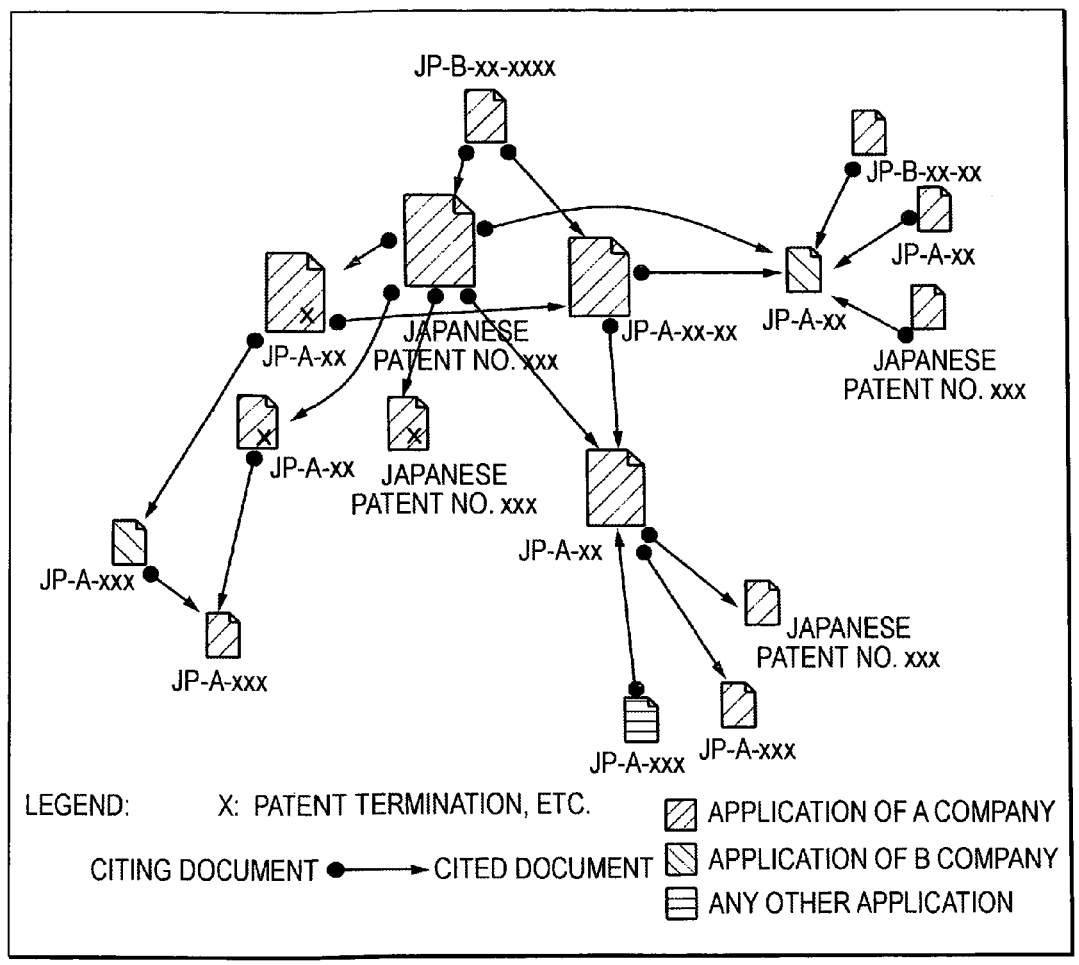
FIG. 5 is a schematic representation that illustrates a display example of the analysis result of the document data analysis apparatus according to the exemplary embodiment of the invention.

Further, in the icon display at step S5, an arrow, etc., extended from a citing document to a cited document is also displayed for the documents contained in the relevant document group (the arrow represents the direction of the influence power) for explicitly illustrating the citation relationship (FIG. 5). The art of thus displaying the icons discretely as a graph is widely known and therefore will not be discussed again here in detail.

The size of each corresponding icon may be changed in response to the active value of each document (active value in the equilibrium state), as illustrated in FIG. 5. If a search keyword is specified as the analysis condition, the icon size may be changed according to the similarity with the search keyword.

Further, the icons of the documents may be displayed in different colors or may be changed in shape or pattern based on the bibliographic information associated with the documents. For example, it is possible to display the document icons in different colors by applicant.

Whether plural documents are in a linkage state is judged and determined based on a condition for discriminating the linkage state, the condition being set arbitrarily. For example, using a linkage condition of "documents of plural of documents involved in the same applicant (attention document group) citing one document not belonging to the attention document group as one common cited document," the documents in the attention document group satisfying the linkage condition may be displayed so that they can be distinguished from other documents (P). For example, the documents in the attention document group can be surrounded by a line. Using a linkage condition of "plural documents involved in the same applicant linked as a chain based on the citation relationship (one is cited document and the other is citing document), the documents applied by one applicant as a chain may be displayed as linked documents so that they can be distinguished from other documents (Q).

Figure 6:
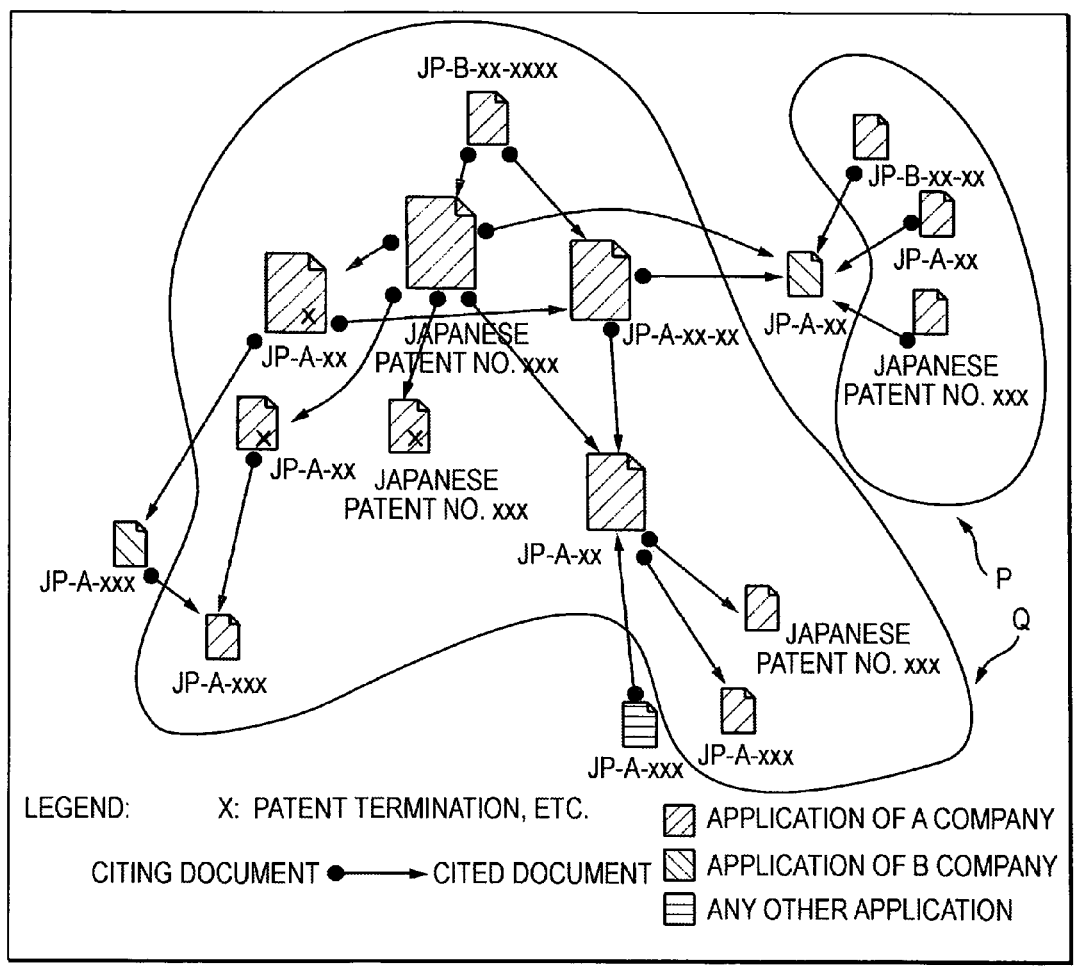
FIG. 6 is a schematic representation that illustrates another display example of the analysis result of the document data analysis apparatus according to the embodiment of the invention.
Figure 7:
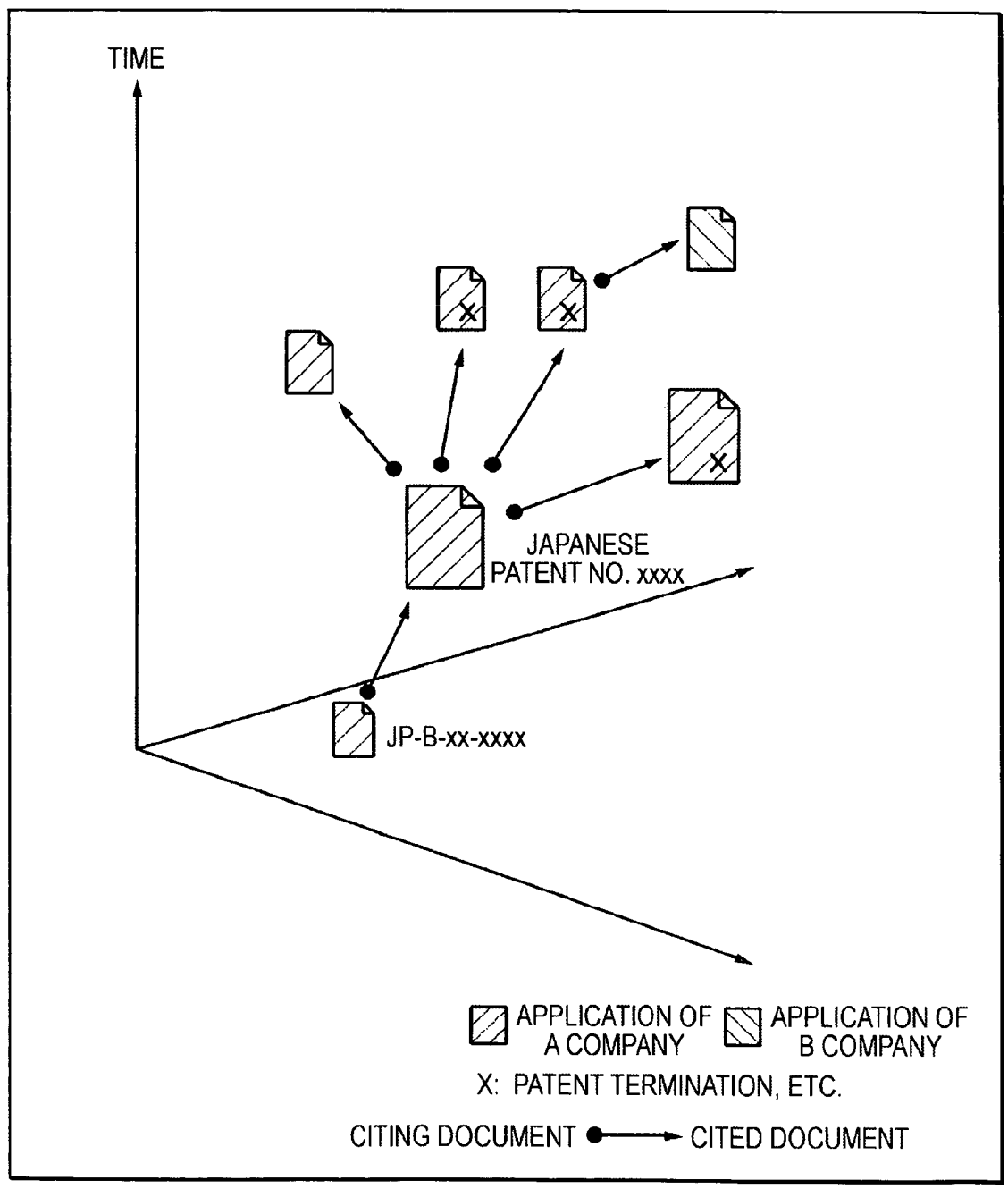
FIG. 7 is a schematic representation that illustrates still another display example of the analysis result of the document data analysis apparatus according to the exemplary embodiment of the invention.

Further, the icon display need not be two-dimensional as in FIG. 5 or 6 and may be arranged three-dimensionally based on application date information as bibliographic information associated with each document (FIG. 7). The user can visually recognize the time lapse and the situation of the relevant documents by rotating the virtual three-dimensional space, etc.

Further, if vital importance information of patent is associated with each document, a mark based on the vital importance information may be added to the corresponding icon or the icon may be changed in shape or pattern for display. In FIGS. 5 and 6, an X mark is added to the item whose patent is terminated or cannot be granted for display by way of example.

Documents cited in the process of the examination of one patent application are not limited to patent documents. Then, the storage section 13 may also store documents other than patent documents (non-patent documents) and when a non-patent document is displayed as an icon, it may be displayed so that it can be distinguished from patent documents. For example, a non-patent document and a patent document can be displayed as different icons or in different colors so that they can be distinguished from each other.

Thus, according to the embodiment, the relation between the relevant documents from the viewpoint from the context specified by the user as the analysis condition, namely, the relationship between the description contents of the documents (for example, technical principles in patent) can be presented.

In the description made so far, it is assumed that the documents are patent documents, but the documents are not limited to patent documents and may be papers, other technical documents, judicial precedents, and others having the citation relationship.

What is claimed is:

1. A document data analysis apparatus, the document data analysis apparatus being connected to a database storing a plurality of document groups in which citation relationships are defined, each of the plurality of document groups comprising a plurality of documents, comprising:

a receiving unit that receives an analysis condition comprising at least one of a document search condition and a specification of a seed document group based on at least a search key word and a bibliographic condition, the seed document group being a seed of an active propagation process;

a determining unit that determines an initial active value of each of the plurality of documents based on the analysis condition;

an executing unit that executes the active propagation process based on the initial active value and a plurality of citation relationships by evaluating concurrently a first and second groups of documents per each document of the seed document group, the first group of documents associated with a document of the seed document group as the cited document, and the second group of documents associated with the document of the seed document group as the citing document and updating the seed document group based on the evaluation;

a terminating unit that terminates the active propagation process once the result reaches equilibrium; and an output unit that outputs a result of the active propagation to a display, wherein the output unit outputs the result so that the display displays an icon for each of the plurality of documents in the equilibrium result of the active propagating process, a size of the icons varies depending on the equilibrium result for each of the plurality of documents in the equilibrium result.

2. The document data analysis apparatus as claimed in claim 1 wherein the display displays a document group satisfying a linkage condition so that the document group satisfying the linkage condition can be distinguished from other document groups.

3. The document data analysis apparatus according to claim 1, wherein the output unit outputs the result so that a color of the icons varies depending on bibliographic information for each of the plurality of documents in the equilibrium result.

4. The document data analysis apparatus according to claim 3, wherein each of the documents is a patent document, the bibliographic information includes information relating to applicants of the patent documents, and the output unit outputs the result so that the color of the icons varies depending on the information relating to the applicants.

5. The document data analysis apparatus according to claim 1, wherein the output unit outputs the result so that at least one of a shape or a pattern of the icons varies depending on bibliographic information for each of the plurality of documents in the equilibrium result.

6. The document data analysis apparatus according to claim 1, wherein the display displays a document group satisfying a linkage condition so that the document group satisfying the linkage condition can be distinguished from other document groups by a line surrounding the document group.

7. The document data analysis apparatus according to claim 1, wherein the display displays an icon for each of the plurality of documents in the equilibrium result of the active propagating process, the icon displayed at least on a time axis based on application date information for each of the plurality of document in the equilibrium result.

8. The document data analysis apparatus according to claim 1, wherein the output unit outputs the result so that an appearance of the icons varies depending on at least one of whether a patent is terminated or whether an application cannot be granted.

9. A method of document data analysis comprising:

receiving an analysis condition comprising at least one of a document search condition and a specification of a seed document group based on at least a search key word and a bibliographic condition, the seed document group being a seed of an active propagation process;

accessing a database storing a plurality of groups in which a citation relationship is defined, each of the plurality of document groups comprising a plurality of documents;

determining an initial active value of each of the plurality of documents based on the analysis condition;

executing the active propagation process based on the initial active value and a plurality of citation relationships by evaluating concurrently a first and second groups of documents per each document of the seed document group, the first group of documents associated with a document of the seed document group as the cited document, and the second group of documents associated with the document of the seed document group as the citing document and updating the seed document group based on the evaluation; and outputting a result of the active propagation to a display, wherein the outputting step outputs the result so that the display displays an icon for each of the plurality of documents in the equilibrium result of the active propagating process, a size of the icons varies depending on the equilibrium result for each of the plurality of documents in the equilibrium result.

10. A computer readable medium storing a program causing a computer to execute a process for analyzing a relationship between a plurality of document groups in which a citation relationship is defined, each of the plurality of document groups comprising a plurality of documents:

receiving an analysis condition comprising at least one of a document search condition and a specification of a seed document group based on at least a search key word and a bibliographic condition, the seed document group being a seed of an active propagation process;

accessing a database storing the plurality of document groups in which a citation relationship is defined, each of the plurality of document groups comprising a plurality of documents;

determining an initial active value of each of the plurality of documents based on the analysis condition;

executing the active propagation process based on the initial active value and a plurality of citation relationships by evaluating concurrently a first and second groups of documents per each document of the seed document group, the first group of documents associated with a document of the seed document group as the cited document, and the second group of documents associated with the document of the seed document group as the citing document and updating the seed document group based on the evaluation; and outputting a result of the active propagation to a display, wherein the outputting step outputs the result so that the display displays an icon for each of the plurality of documents in the equilibrium result of the active propagating process, a size of the icons varies depending on the equilibrium result for each of the plurality of documents in the equilibrium result.

11. The computer readable medium according to claim 10, wherein the outputting step outputs the result so that a color of the icons varies depending on bibliographic information for each of the plurality of documents in the equilibrium result.

12. The computer readable medium according to claim 11, wherein each of the documents is a patent document, the bibliographic information includes information relating to applicants of the patent documents, and the outputting step outputs the result so that the color of the icons varies depending on the information relating to the applicants.

13. The computer readable medium according to claim 10, wherein the outputting step outputs the result so that at least one of a shape or a pattern of the icons varies depending on bibliographic information for each of the plurality of documents in the equilibrium result.

14. The computer readable medium according to claim 10, wherein the display displays a document group satisfying a linkage condition so that the document group satisfying the linkage condition can be distinguished from other document groups by a line surrounding the document group.

15. The computer readable medium according to claim 10, wherein the display displays an icon for each of the plurality of documents in the equilibrium result of the active propagating process, the icon displayed at least on a time access based on application date information for each of the plurality of documents in the equilibrium result.

16. The computer readable medium according to claim 10, wherein the outputting step outputs the result so that an appearance of the icons varies depending on at least one of whether a patent is terminated or whether an application cannot be granted.

* * * * *